United States Patent
Martocchia

(10) Patent No.: US 12,251,602 B2
(45) Date of Patent: Mar. 18, 2025

(54) MEASURING DEVICE / SENSOR SYSTEM FOR MEASURING, TRANSFERRING AND PROCESSING OF RELEVANT PERFORMANCE DATA FROM TRAINING AND COMPETITION IN CONTACT SPORTS, IN PARTICULAR THE PHYSICAL CONTACT AND ITS FORCE EFFECT

(71) Applicant: Timo Martocchia, Villingen (DE)

(72) Inventor: Timo Martocchia, Villingen (DE)

( * ) Notice: Subject to any disclaimer, the term of this patent is extended or adjusted under 35 U.S.C. 154(b) by 168 days.

(21) Appl. No.: 17/782,210

(22) PCT Filed: Dec. 15, 2020

(86) PCT No.: PCT/DE2020/000334
§ 371 (c)(1),
(2) Date: Jun. 3, 2022

(87) PCT Pub. No.: WO2021/121459
PCT Pub. Date: Jun. 24, 2021

(65) Prior Publication Data
US 2023/0011015 A1    Jan. 12, 2023

(30) Foreign Application Priority Data
Dec. 19, 2019    (DE) .................. 10 2019 008 857.3

(51) Int. Cl.
*A63B 71/06* (2006.01)
*A63B 24/00* (2006.01)
(Continued)

(52) U.S. Cl.
CPC ...... *A63B 24/0062* (2013.01); *A63B 71/0622* (2013.01); *G01L 5/16* (2013.01);
(Continued)

(58) Field of Classification Search
CPC ............ A63B 2220/10; A63B 2220/12; A63B 2220/51; A63B 2220/53; A63B 2220/56;
(Continued)

(56) References Cited

U.S. PATENT DOCUMENTS

| 2011/0098094 A1* | 4/2011 | Forsell .................. A63B 69/02 463/8 |
| 2012/0279311 A1* | 11/2012 | Helmer .................... F41J 5/056 73/768 |

(Continued)

*Primary Examiner* — Lawrence S Galka

(57) ABSTRACT

Measuring device/sensor system for measuring, transferring and processing of relevant performance data from training and competition in contact sports, in particular the physical contact and its force effect In practice and as far as possible, performance data in contact sports, in particular those of factual contact and force effect of relevant objects and persons to each other, are not surveyed separately but evaluated subjectively. In contact sports like martial arts this is especially critical, because an occurred contact and its force effect are the significant success data in these sports. In other types of contact sports, e.g. ball sports one is concentrated on the performance data, that lead to goal achievement (e.g. goal scoring) and is not looking objectively into the performance of participants for, for example, draw conclusions about the correct technique execution at any time in a game or competition. Though there are already measuring devices for some contact sports for detecting force effect and contact, these are limited to several defined single sensors and applications. Therefore it may be possible to make objective measurement but in case of doubt, a subjective evaluation of technique and point assignment is still necessary. This invention contains a system of measuring devices, that can, especially in martial arts sports, improve the point assignment and in other contact sports the evaluation of techniques.

These special measuring devices for contact measuring and its movement and acceleration sensors, display systems and (Continued)

hardware interfaces can be combined with software interfaces and be tailored to fit different applications.

In case of martial arts sports, the configuration of protective equipment with these measuring devices is one use case, in which the measuring devices detect all relevant data like contact, force effect and movement direction, that can be used for competition decisions.

6 Claims, 3 Drawing Sheets

(51) Int. Cl.
  *A63B 69/00* (2006.01)
  *G01L 5/16* (2020.01)
  *G01L 5/161* (2020.01)
  *G01P 15/18* (2013.01)

(52) U.S. Cl.
  CPC .............. *G01L 5/161* (2013.01); *G01P 15/18* (2013.01); *A63B 2220/40* (2013.01); *A63B 2220/53* (2013.01); *A63B 2220/58* (2013.01); *A63B 2220/836* (2013.01); *A63B 2225/20* (2013.01); *A63B 2225/50* (2013.01); *A63B 2244/10* (2013.01)

(58) Field of Classification Search
  CPC ............ A63B 2220/58; A63B 2220/80; A63B 2220/802; A63B 2220/833; A63B 2220/836; A63B 2225/20; A63B 2225/50; A63B 2225/52; A63B 2225/54; A63B 2244/10; A63B 2244/102; A63B 2244/104; A63B 2244/106; A63B 69/02; A63B 69/26; A63B 71/14; A63B 71/145; A63B 71/0605; A63B 71/0669; A63B 71/08; A63B 71/12; A63B 24/0003; A63B 24/0062; A63B 2024/004; A63B 2024/0043; A41D 1/002; A41D 19/0027; A42B 3/0433; A42B 3/046; G01L 5/0052
  See application file for complete search history.

(56) References Cited

U.S. PATENT DOCUMENTS

2018/0326283 A1\* 11/2018 Sexton .................. A63B 69/32
2019/0388756 A1\* 12/2019 Marciano ............ A63B 71/146
2020/0188758 A1\* 6/2020 Song ................. A63B 71/0605

\* cited by examiner

MEASURING DEVICE / SENSOR SYSTEM FOR MEASURING, TRANSFERRING AND PROCESSING OF RELEVANT PERFORMANCE DATA FROM TRAINING AND COMPETITION IN CONTACT SPORTS, IN PARTICULAR THE PHYSICAL CONTACT AND ITS FORCE EFFECT

Measuring device/sensor system for measuring, transferring and processing relevant performance data from training and competition in contact sports, in particular the physical contact and its force effect

STATE OF THE ART

In contact sports, such as the unarmed martial arts boxing, kickboxing or in the armed martial arts such as kendo, the success and performance of the training and competition has so far been assessed through subjective evaluation by appropriately trained trainers or referees, respectively scoring judges. These do not only pay attention to the correct execution of techniques but also evaluate the relevant performance data as hits and their corresponding imaginary force effects with points or by means of other evaluation scales, especially in sparring or in competition. This is done in order to make the training success or the victory of a competitor measurable.

However, this subjective assessment or evaluation is error-prone, as there are no objective standards and the evaluation is always made from outside the fighting, purely visually from the point of view of the respective judge. In order to objectify this, there have been efforts and associated patent and utility model applications for many years to take direct measurements of the physical contact of the opponents directly from the fight. From the publications DE 20 2007 010 147 U1, DE20 2010 004 451 U1 and DE20 2010 004 520 U1, DE 20 2007 010 150 U1 or US20120203361A1 for example, sensors and protective equipment with the possibility of data transmission are known, which use a piezoelectric effect to measure the pressure that is exerted on a body part or training device equipped with it for an evaluation. Similar pressure sensors that detect a change in electrical measured values are known from the publication WO00/69523 or US 2016/0309807 A1. For a training device in a similar way from U.S. Pat. No. 9,227,128B1. Another way of measuring a hit and its effectiveness on contact, using vibration/acceleration sensors, can be found in U.S. Pat. No. 9,320,954 B1. Also variants in which already the approach of a hit can be measured with a sensor are known from 1020150007661 A (Korea).

In other contact sports, in which collisions with opponents (e.g. rugby or American football) or objects (tennis, soccer, baseball, etc.) are part of the respective sport, the actual contact and the measurement of a corresponding hit and its hardness have so far been largely disregarded, with a few exceptions as in WO 2012/171003 A1, US2017/0086519 A1 or with the help of measuring the speeds of moving objects using RADAR in U.S. Pat. No. 6,378,367 B1. So far, they have not been considered sufficiently relevant for training or competition success. From the military field US2008009245A1 is also known with impact sensors for measuring the impact of projectiles.

Further international publications based on similar approaches like those described above for measuring a hit and the force applied to it in various sports can be found, for example, In DE 20 2016 004467 U1, WO 2004/004840, WO 2007/011145, WO 2011/047410 A1, WO 2017/120667 A1, US 2003/0217582 A1, US 2004/0199232 A1, US 2015/0157917 A1, US 2016/0018278 A1, 101018038 B1 (Korea), 101093669 B1 (Korea), 1020100082874 A (Korea), 1020110019570 A (Korea), 1020130013398 A (Korea), 1020160092769 A (Korea), 2003038703 A (Japan), 2007181673 A (Japan), 2011-104192 A (Japan), GB 2 400917 A, EP 2 236 177 A1, DE 10 2016 001 440 A1 2017.08.10, AU 2016231496 A1, 1020100006069 A (Korea), WO 2010/005169, US 2011/0159939 A1 and US 2013/0282155 A1.

Many of the approaches described above are limited to a few key solutions such as a specific sensor. In addition, sensor systems are already known, for example in U.S. Pat. No. 9,427,623 B2, which combine several of these approaches in order to increase the accuracy and applicability in the respective contact sports. Similar designed individual components as the measuring devices described in this patent application for measuring electrical signals upon contact according to claim 1 can be found in RU 2 519 985 C1, 2000042162 A (Japan) and U.S. Pat. No. 8,876,613. The publications U.S. Pat. No. 4,761,005, WO 2009/087124 A2, 1020140066024 A (Korea), 1020110101568 A (Korea) and 10 1325992 (China) describe measuring devices for measuring pressure with similarly possible measuring assemblies according to claim 2. 1020140080413 A (Korea) describes a possibility of displaying hits for the user according to claim 4. A possibility of assigning objects by means of radio signals from the military sector is known from DE60207253.

Problem

The measuring device/sensor system described in the main claim of the specified invention does not only want to measure the respective hit and its force effect in case of a contact for an evaluation like the already known solutions from the publications mentioned. In addition, in many cases these are tailored to a few contact sports. Similar to fencing, in which an electronic system for measuring hits has been established for decades, but which restricts the direction of movement of the participants during competition or training due to the necessary cabling to keep the participants in one electric circuit. For martial arts such as kickboxing, boxing, etc., the above mentioned and already published sensors for hit detection are on their own capable of recognizing relevant hits and also their force effect, but they do not offer the possibility to provide fundamental real-time decisions for correct scoring in competition or training without further interpretation of the data by, for example, a referee or a scoring judge.

Pure pressure sensors can measure the pressure, but for example in a boxing competition, without additional referees, it is not easy to tell whether the pressure sensor is triggered by, for example, a blocking arm that acts on the pressure sensor and absorbs the pressure. In order to be meaningful here, the pressure sensor has to be configured in a complex manner. In addition, there are also pure point competitions, for example in kickboxing, in which a correctly performed touch is sufficient for a point evaluation. In fact, too hard contact is undesirable here. In this case, pure proximity sensors alone are also not sufficient enough for an adequate good and correct hit detection. A sensor alone, which only reacts to surface contact, would not necessarily be meaningful here either, because data on the force effect of a hit must also be made available. In addition, in these competitions, for example, different points depending on the technique class performed are given (e.g. a kick or a jumped kick to the head gives more points than to the stomach), instead also further measuring devices are required for this.

For contact sports that are not martial arts sports, data directly from training and competition events are often missing. Especially in ball sports, measurements of hits and their effectiveness of relevant objects or body parts in relation to each other are collected from the outside and are mostly limited to the point in time immediately before scoring or in case of a violation of the hardship rules (foul) (e.g. video evidence in football or ice hockey).

By linkage of several measuring devices to a system according to the main claim, there is the possibility of providing sufficient relevant data for individual evaluation systems of the respective training or the competition of many different contact sports.

Solution

The measuring device/sensor system from the main claim, characterized by the features of the measuring devices according to claim 1, which reacts to pure touch of at least two separated open circuits, supplemented by further measuring devices from claim 3, which can recognize the direction of movement and acceleration of the respective part, is designed to collect relevant data for real-time decision-making in many contact sports. Due to the possibilities according to claims 5 and 6 of transferring and processing the collected data via interfaces, filters for a wide variety of rules for contact sports are possible and the system is not limited to a single application. In addition, the adjacent software systems offer the possibility of adapted data preparation, provision and use. The possibility of adjusting flexible and Inflexible parts also allows adaptation to a wide variety of objects, clothing or protective equipment. Furthermore, with an implementation of a display option according to claim 4, the respective participants in the training or competition can also immediately display their own performance data, for example a correctly executed hit.

Achieved Benefits

In the system listed here, suitable measuring devices and sensors are available in order, for example, to adequately replace scoring judges' decisions in armed and unarmed martial arts. Moreover it also provides an essential basis for the safety and health of the fighters. Because a "knock out" is still the clearest evaluation of the victory of an opponent, especially in full-contact competitions in martial arts, whether with or without weapons. However, this means that one fighter always bears significant damage and can no longer fight unrestrictedly in the respective encounter. Such a measuring device/sensor system can, by adapting it to any clothing or protective equipment, ensure correct evaluation, especially for martial arts, so that scoring judges are no longer necessary. In this way, competition decisions can also be made with the exclusion of a knock-out. For forms of competition in martial arts that want to exclude contact that is too hard, this offers the possibility of objectively defining "too hard hits".

In relation to other contact sports that are not martial arts, adjustments to the system are possible, which allow performance data on the techniques and movement patterns performed. In soccer, for example, it is conceivable to equip a ball and a sports shoe with such measuring devices so that it is possible to understand which part of the ball is hit with which part of the shoe when a shot is taken. This allows a more detailed evaluation of the player's technique, for example, for a corner kick.

Embodiment

One embodiment of the invention can be implemented by attaching the described components according to claim 1 to protective equipment for martial arts point competitions. The measuring devices according to claim 1, implemented as measured variable transmitters (1a) and measured variable receivers (1b) initially can be implemented in such a way that open lines are applied to a flexible foil (a1), using form-fitting, force-fitting or substance-to-substance bonding connection techniques, for example sewing, screwing or gluing. These are designed in such a way that the open lines are fixed next to one another at a defined distance so that they do not touch. Finally, they are connected to a microcontroller that contains hardware and software interfaces (b1) and is equipped with an integrated acceleration sensor (c1).

On the respective piece of protective equipment used, such as a protective vest, gloves, helmet (2, a2) or, for example, special foot protectors, such foils with lines (b2) and microcontrollers (d2), as well as the acceleration sensors (e2), are attached respectively inserted. In this case, the display system according to claim 4 can, for example be integrated in the field of vision of a helmet or in an area of protective equipment that is not directly necessary for hit detection and implemented as simple LED diodes and/or flexible LED displays (c2) and also be connected to the microcontroller.

In the competitive situation (3) on the fighting area (a3), an assignment and connection of all required measuring devices to a central unit such as a computer or a mobile device (e3), which can be used to configure the components and evaluate or distribute the data, is in this case wirelessly possible. Said central unit can take over the distribution of the data of several measuring devices according to claim 1 via a software interface according to claim 6. This can happen, for example, in a competition between two competitors (b3 and c3) who are equipped with such measuring devices according to claim 1 on their protective equipment such as a helmet (d3), as shown here. When measured variable receivers touch a measurement variable transmitter, an assignment is possible by reading out the respective electrical signature (e.g. voltage and/or current and/or frequency and/or electrical resistance) of the measured variable transmitter and the measured variable receiver can send the information to the central unit. On the basis of the acceleration data from the acceleration sensor, it is also possible to draw conclusions about the force acting on the respective measured variable transmitter. Once configured to the evaluation rules of the respective competition, the correct point evaluation can be measured directly with the effect of the force.

BRIEF DESCRIPTION OF THE SEVERAL VIEWS OF THE DRAWINGS

The drawings contain 4 separate figures, named as FIG. 1a, FIG. 1b, FIG. 2 and FIG. 3.

Figure 1A:
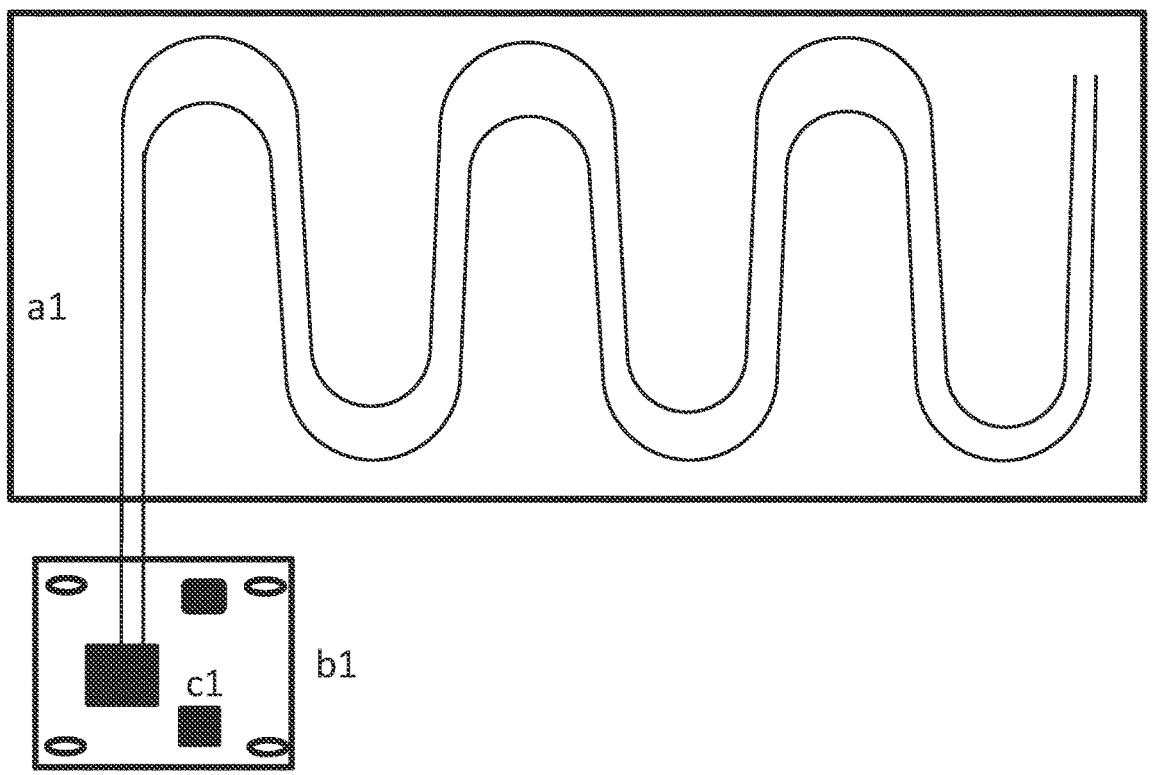
FIG. 1a and FIG. 1b show a schematic structure of the transmitting and receiving parts of the measuring device. The structure of the measured variable transmitter (FIG. 1a) and the measured variable receiver (FIG. 1b) seem identical, as open lines are applied to a flexible foil. Per definition, the open lines are outgoing for FIG. 1a and ingoing for FIG. 1b from the corresponding microcontroller.
Figure 1B:
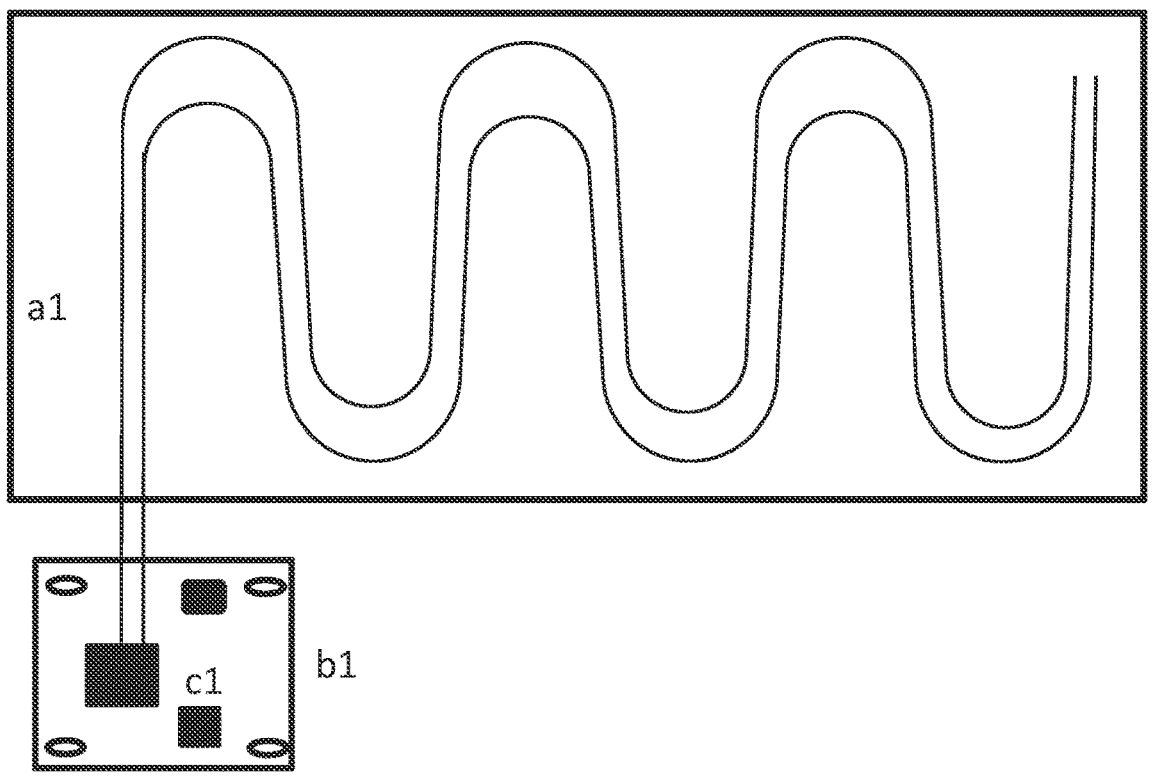
Figure 2:
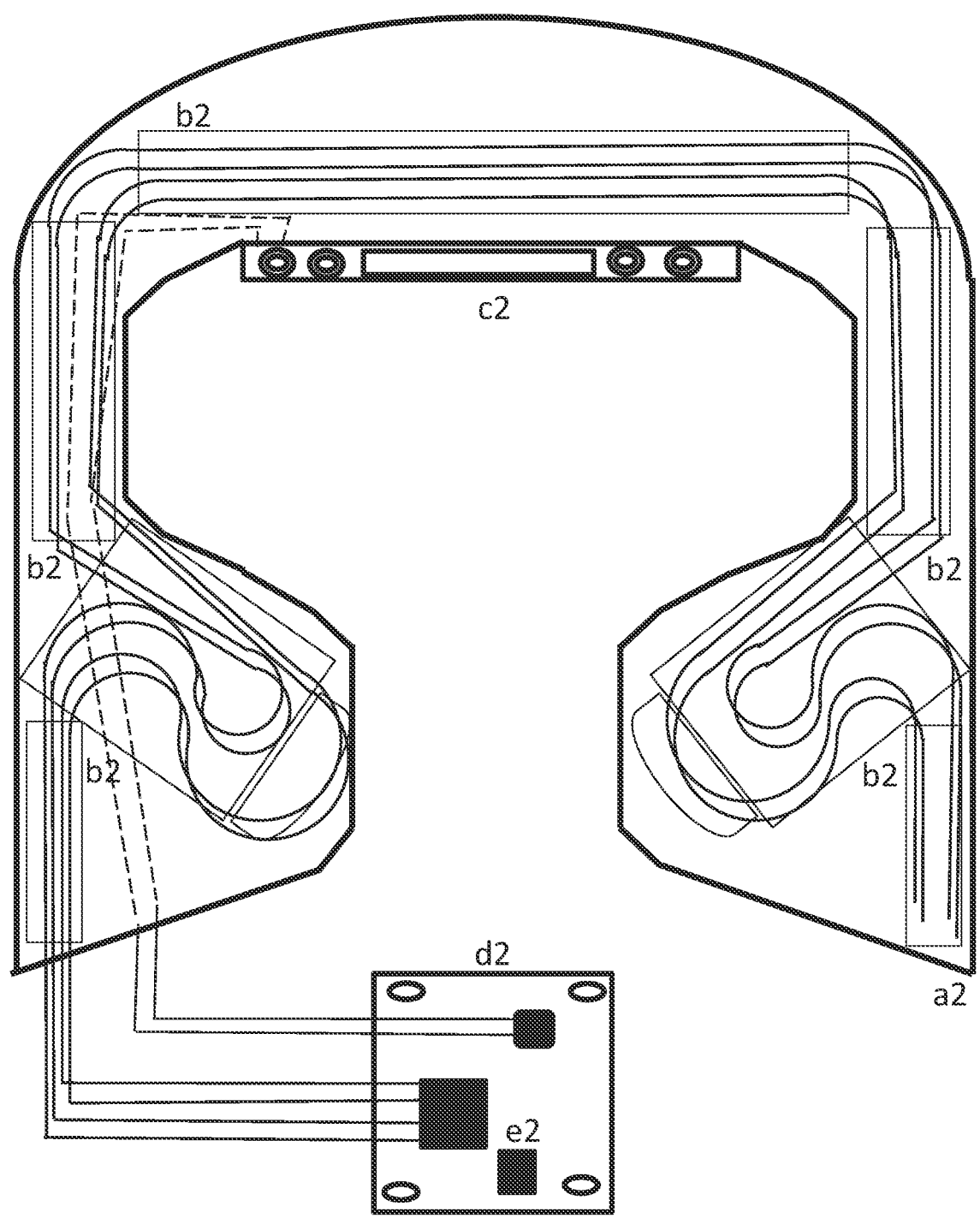
FIG. 2 shows the schematic attachment of the device to a protective helmet. Open lines are connected to a microcontroller and are applied to multiple flexible foils, that are attached to different parts of the helmet. In this figure, the microcontroller also holds a connection to a display system with separate lines. This display system is attached to the forehead part of the helmet.
Figure 3:
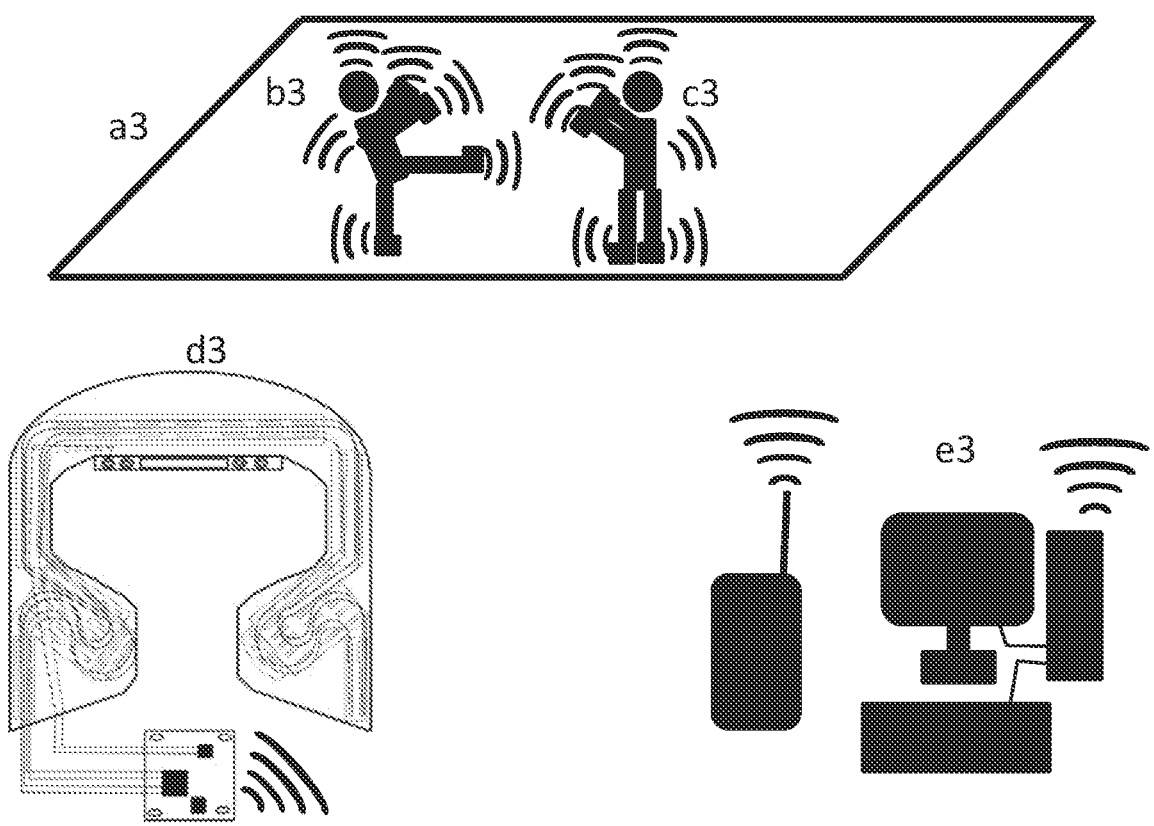
FIG. 3 shows a schematic competitive situation in which measuring devices are used. On a fighting area, two competitors wearing different devices are shown, that are wirelessly in connection with a mobile device or a computer. The corresponding radio waves from the competitors are shown on the upper part and the corresponding radio waves of the mobile device and the computer are shown on the right bottom part of the figure. The left bottom part of the figure shows the schematic attachment of the device to a protective helmet as shown in FIG. 2, as it can be used in the competitive situation.

The invention claimed is:

1. Measuring device/sensor system for measuring, transferring and processing of relevant performance data from training and competition in contact sports, in particular the physical contact and its force effect, which includes at least one measuring device for measuring electrical signals in the form of frequency and/or electrical resistance, each consisting of at least one measured variable transmitter and at least two measured variable receivers or each consisting of at least two measured variable transmitters and one measured variable receiver, which only enable at mutual contact an electrical signal transmission and/or measurement, in the form of electrical signatures that consist of identifiers from electrical resistance and/or frequency, between the respective separated circuits and/or electric systems and thereby allow an exact assignment of the respective measured variable receivers and/or measured variable transmitters involved in the signal transmission,
characterized
in that the electrical conductive/potential-carrying parts of the measured variable receivers and measured variable transmitters are executed as rigid and/or flexible lines and/or surfaces, outgoing and/or incoming from at least one programmable electronic arithmetic unit (e.g. with integrated circuits) and/or microprocessor and/or microcontroller and/or microcomputer system/embedded system and/or sensor chip and are not, or not entirely, electrically isolated, firmly connected and/or integrated with a substrate, e.g. a foil and/or another rigid and/or flexible and/or electrically insulating material as a carrier and/or also strapless, directly with an object and/or biological structures (e.g. skin), through form-fitting and/or force-fitting and/or substance-to-substance bonding connection techniques (e.g. sewing, screwing or gluing), and are arranged in such a way that crosstalk and/or overleaping and/or bridging of the electrical signals between measured variable receivers and measured variable transmitters located in separate circuits/electric systems are possible due to a physical contact and/or its force effect.

2. Measuring device/sensor system according to claim 1, characterized
in that at least one electrical component and/or at least one additional programmable electronic arithmetic unit (e.g. with integrated circuits) and/or microcontroller and/or microprocessor and/or microcomputer system/embedded system and/or at least one additional sensor/sensor Chip and/or at least one additional input device assembly (e.g. in the form of keyboards or touch-screens) and/or at least one threshold value switch assembly and/or at least one additional measuring device and/or additional measuring device/measuring assembly for measuring electrical effects (e.g. capacitive, resistive, piezoelectric or photoelectric effects) and their properties and/or other electrical properties, wired and/or wirelessly connected, is part of the measuring device/sensor system according to claim 1 or is itself integrated directly as part of the respective measuring devices.

3. Measuring device/sensor system according to claim 1, characterized
in that at least one additional measuring device/sensor for measuring the acceleration and/or movement/direction of movement and/or the localization of the spatial location, connected with at least one programmable electronic arithmetic unit (e.g. with integrated circuits) and/or microprocessor and/or microcontroller and/or microcomputer system/embedded system and/or at least one electrical component by wire and/or wirelessly, is part of the measuring device/sensor system according to claim 1 or is itself integrated directly as part of the respective measuring devices.

4. Measuring device/sensor system according to claim 1, characterized
in that at least one flexible and/or rigid electronic display system for the visualization and reproduction of recorded data of the measuring device/sensor system according to claim 1, designed as displays and/or LED lighting units, connected with at least one programmable electronic arithmetic unit (e.g. with integrated circuits) and/or microprocessor and/or microcontroller and/or microcomputer system/embedded system and/or at least one electrical component, wired and/or wirelessly connected, is part of the measuring device/sensor system according to claim 1 or is itself integrated as part of the respective measuring devices, directly attached or inserted to the clothing and/or protective equipment of participating users or the objects relevant to the respective contact sport.

5. Measuring device/sensor system according to claim 1, characterized
in that at least one hardware interface for wired and/or wireless (e.g. Bluetooth or WLAN interface) transmission of the data/signal information, as well as for receiving and/or processing external data and configuration commands, connected with at least one programmable electronic arithmetic unit (e.g. with integrated circuits) and/or microprocessor and/or microcontroller and/or microcomputer system/embedded system and/or at least one electrical component, by wire and/or wirelessly, is part of the measuring device/sensor system according to claim 1 or is itself integrated directly as part of the respective measuring devices and communicates with at least one further measuring device/sensor system according to claim 1 and/or at least one central unit and/or peripheral device.

6. Measuring device/sensor system according to claim 1, characterized
in that at least one software solution with a suitable software interface for managing and processing the collected data/signal information of the measuring device/sensor system according to claim 1, its configuration, as well as for receiving and processing external information and content from other software solutions, with the possibility of evaluating, storing, managing and using the data in any large network and/or a cloud and associated input and output devices, communicates with at least one measuring device/sensor system according to claim 1 and/or at least one central unit.

\* \* \* \* \*